United States Patent
Ananda et al.

(10) Patent No.: US 6,904,790 B2
(45) Date of Patent: Jun. 14, 2005

(54) SYSTEM AND METHOD FOR ECM LAND EROSION METROLOGY

(75) Inventors: Mysore Venkatachalan Ananda, Sunnyvale, CA (US); Steve G. Gonzalez, Santa Cruz, CA (US); Christopher Rowe Hakes, Felton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/465,742

(22) Filed: Jun. 18, 2003

(65) Prior Publication Data

US 2004/0025577 A1 Feb. 12, 2004

Related U.S. Application Data

(60) Provisional application No. 60/401,796, filed on Aug. 6, 2002.

(51) Int. Cl.[7] .............................................. G01N 17/00
(52) U.S. Cl. ............................................................. 73/86
(58) Field of Search .............................. 73/86, 104, 105

(56) References Cited

U.S. PATENT DOCUMENTS

| 5,251,154 A | 10/1993 | Matsumoto et al. |
| 5,934,680 A | * 8/1999 | Kakehi et al. ............... 277/499 |
| 6,067,720 A | 5/2000 | Heilbronner et al. |
| 6,239,436 B1 | 5/2001 | Parker et al. |
| 6,297,652 B1 | 10/2001 | Shimoda et al. |

* cited by examiner

Primary Examiner—Robert Raevis
(74) Attorney, Agent, or Firm—Raghunath S. Minisandram; Jesus Del Castillo

(57) ABSTRACT

A system and method for characterizing and measuring hydrodynamic grooves made by ECM processes is disclosed. The method includes a procedure for alignment of the work piece to the measurement apparatus as well as a technique for accurately reliably measuring the erosion pattern quickly. Additionally, the invention provides a system for characterizing and measuring the erosion of these grooves.

11 Claims, 5 Drawing Sheets

SYSTEM AND METHOD FOR ECM LAND EROSION METROLOGY

This application claims priority from U.S. provisional application Ser. No. 60/401,796, filed on Aug. 6, 2002

BACKGROUND OF THE INVENTION

1. Field of the Invention

The present invention relates generally to the field of fluid dynamic bearings and more particularly to etching grooves in a hub used in a spindle motor of a disk drive to form such bearings.

2. Description of the Related Art

Conventional disc drives use magnetic properties of materials to store and retrieve data. Typically, disc drives are incorporated into electronic equipment, such as computer systems and home entertainment equipment, to store large amounts of data in a form that can be quickly and reliably retrieved. The major components of a disc drive include magnetic media, read-write heads, motors and software. Motors, which are used to spin media at several thousand revolutions per minute, are constructed to spin with minimal vibration and to be reliable and efficient. One of the ways this is done is by insuring proper lubrication of critical moving components in the motor with oil. Proper lubrication of a motor is typically achieved by incorporating grooves in the bore of the hub and shaft through cutting processes such as electrochemical machining (ECM) processes. The bore is defined as the inner surface of the hub. Since these grooves are important for maintaining proper oil circulation, erosion of the groves can cause improper oil circulation leading to motor failure because of lockup. Therefore, measuring and understanding the erosion of the grooves in the bore and shaft is important to building a motor robust enough for hard drives.

The cutting process may be performed in any of various electro-erosive machining modes. In electrical discharge machining (EDM), the cutting liquid is dielectric liquid, e.g. deionized water, and the machining electric current is supplied in the form of a succession of electrical pulses. In electrochemical machining (ECM), the cutting medium is a liquid electrolyte, e.g. an aqueous electrolytic solution, and the machining current is a high-amperage continuous or pulsed current. In electrochemical-discharge machining (ECDM), the liquid medium has both electrolytic and dielectric natures and the machining current is preferably applied in the form of pulses, which facilitate the production of electric discharges through the conductive liquid medium.

The work piece may be disposed in a bath of the cutting liquid medium to immerse the cutting region therein. More typically, however, the cutting zone is disposed in the air or ambient environment. Advantageously, one or two nozzles of a conventional design are disposed at one or both sides of the work piece to deliver the cutting liquid medium to the cutting region disposed in the air or immersed in the liquid medium. The cutting liquid medium is conveniently water as mentioned, which is deionized or ionized to a varying extent to serve as a desired electro-erosive cutting medium.

Since modern hard drives require smaller and faster motors having finer critical features, there is a real challenge in both making and measuring the finer features made using these ECM processes and the like. For example, smaller motors have correspondingly smaller and finer groves built into their bores and shafts than ever before. The ECM process is generally known in the art. However, the ECM process raises the need to accurately and simultaneously place grooves on a surface across a gap that must be accurately measured. Deficiencies in mechanical tolerances may cause misalignment of the electrode with the work piece, causing an uneven gap and correspondingly uneven depth hydrodynamic groove. Accurate measurement of these grooves is needed to understand their wear patterns and ultimately design and build better motors. Conventional methods used to measure component wear in motors are inadequate for measuring the small dimensions found in modern bore and shaft grooves because they were developed for measurements of larger features.

Therefore, what is needed is a system and method which overcomes these deficiencies and enables measuring fine features, such as groves, on the bore and shaft of motors.

SUMMARY OF THE INVENTION

The invention provides a system and method for characterizing and measuring hydrodynamic grooves made by ECM processes. Additionally, the invention provides a system and method for characterizing and measuring the erosion of these grooves.

The method for measuring bore erosion includes aligning a stylus with a gauge pin, covering the length of a journal, moving a stylus to an apex region, locating a grove minimum by rotating a hub, rotating said hub to a fixed position, scanning between a first endpoint and a second endpoint collecting data during said scan, analyzing said data by fitting said data to a line, locating a lowest peak in said groove, and calculating the erosion. This process is then repeated after rotating the work piece to a new position. Typically three such measurements are taken with each measurement being taken after the work piece has been rotated by 120 degrees.

The system for measuring bore erosion includes a gauge pin for alignment, a theta chuck for supporting said work piece, a theta stage capable of rotating said theta chuck and said work piece about an axis of rotation, a stylus tip for probing a topography on said work piece while said work piece is rotated, a stylus for supporting said stylus tip, and a surface scanner for measuring the response of said stylus to said topography of said work piece and for controlling and moving said stylus along a direction of stylus motion. The gauge pin can have size substantially the same as that of a bore diameter to be measured and the gauge pin has a region on it along a line that has a maximum variation in height of 30 microns over a length of about 20 mm.

BRIEF DESCRIPTION OF THE INVENTION

DETAILED DESCRIPTION OF THE PREFERRED EMBODIMENTS

The invention provides a system and method for characterizing and measuring hydrodynamic grooves made by ECM processes. Additionally, the invention provides a system and method for characterizing and measuring the erosion of these grooves.

Figure 1:
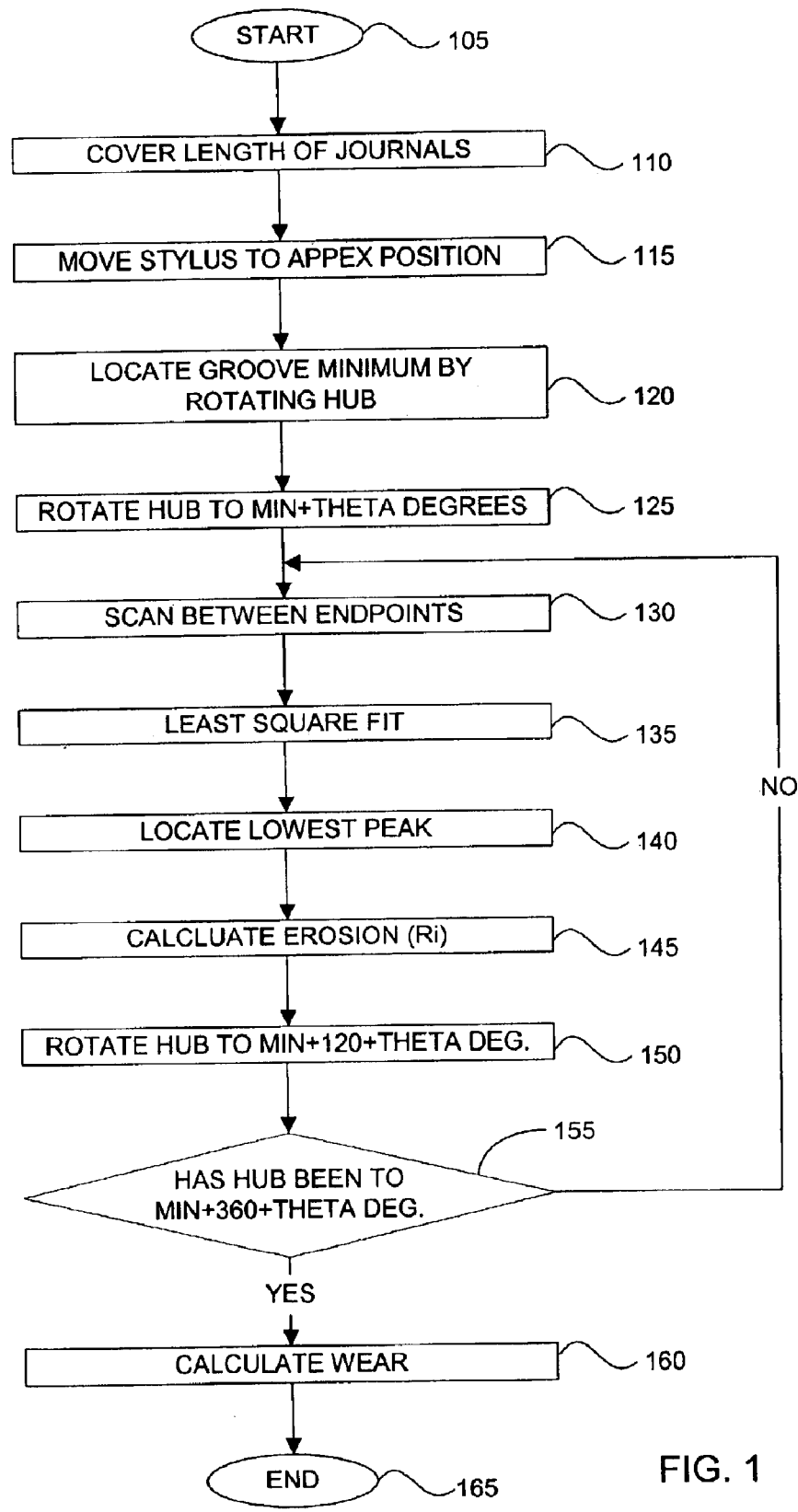
FIG. 1 is a flowchart showing the preferred steps used to measure the land erosion of the hydrodynamic motor with groves in the bore and the shaft in accordance with one embodiment of the invention.

FIG. 1 is a flowchart showing the preferred steps used to measure the land erosion of the hydrodynamic motor with groves in the bore and the shaft in accordance with one embodiment of the invention. First in step 105, the rotary fixture is aligned so that its axis of rotation coincides with the direction of motion of the stylus. Next in step 110, the end points for the movement of the stylus during the measurements are defined by moving the stylus from a first journal to a second journal. The first journal and second journal are typically set at 11.8 mm.

Next in step 115, the stylus is moved to the apex region which is determined by the motor design. In step 120, a groove minimum (MIN) is located by holding the stylus fixed and the rotating the hub. In step 125, after the MIN is located, the hub is rotated by another θ degrees so that the position of the stylus is at MIN+θ degrees. Although the value of θ is typically set at 12, it is determined based on the number of groves.

Next in step 130, the stylus is moved across the fixture from the first journal point to the second journal point scanning the surface and creating a profile of the surface as shown in the attached figures. A line of best fit for the apex region and the original diameter is then calculated using a least square fit algorithm in step 135. Next in step 140, the lowest peak is located and the distance from the least square fit line to the lowest peak is calculated. In step 145 the radial erosion ($R_i$) for this hub angle is calculated. Typically, three radial erosions ($R_i$) will be calculated, one for each hub angle, which is, offset from the previous angle by 120 degrees, resulting in three values $R_1$, $R_2$ and $R_3$.

Next in step 150, the hub is rotated by 120 degrees to a position of MIN+θ+120 degrees. In step 155, a decision is made as to whether the hub has been rotated to a position greater than MIN+θ+360 degrees. If it is determined in step 155 that the position of the hub is not greater then MIN+θ+360 degrees, then steps 130 through 155 are repeated. Typically, step 155 results in performing three scans and calculating three erosion values $R_1$, $R_2$ and $R_3$, at three different angles, as was discussed with reference to step 145 above. Although the hub is rotated by 120 degrees in step 150 it can be rotated by any amount such as 30 degrees or 60 degrees, for example. There is no restriction on the amount of rotation. If it is determined in step 155 that the position of the hub is greater then MIN+θ+360 then step 160 is performed.

In step 160, the total erosion is calculated by averaging the three measured erosions $R_1$, $R_2$ and $R_3$ and multiplying the average by 2. If N scans are performed instead of only three, as described with reference to steps 145 to 155 above, then the total erosion is determined by calculating the average of all the erosions measured and multiplying that by 2 (ie. Total erosion=$\Sigma(R_i)_{i=1\ TO\ N}/N$). Finally, in step 165, the fixture is removed.

Figure 2:
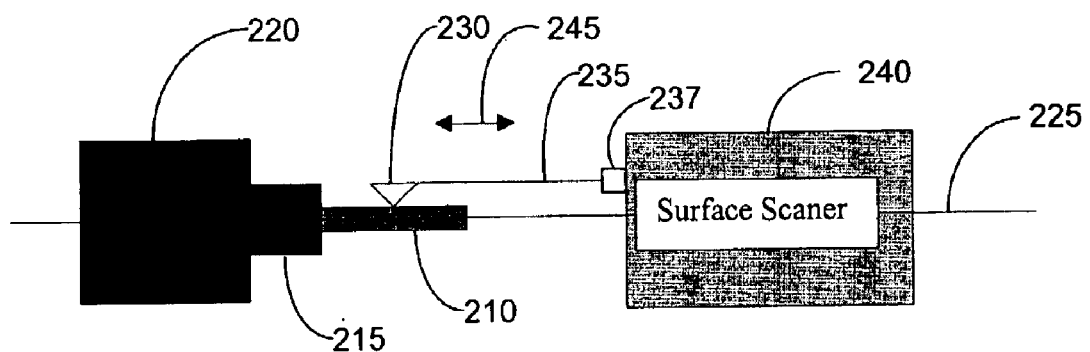
FIG. 2 is a block diagram representing a groove measurement system, in accordance with one embodiment of the invention.

FIG. 2 is a block diagram representing a groove measurement system, in accordance with one embodiment of the invention, including a work piece 210, a theta chuck 215, theta stage 220, an axis of rotation 225, stylus tip 230, a stylus 235, a gauge head 237, a surface scanner 240, and a direction of stylus motion 245. Work piece 210 is typically a motor shaft with grooves in it, or a motor sleeve with grooves, or a gauge pin used for calibration. Theta Chuck 215 is a conventional chuck used to securely mount and hold work piece 210 during profiling. Theta stage 220 rotates work piece 210 to a specified position for profiling and typically includes a servo motor or a stepper motor that can rotate work piece 210 from zero to 360 degrees with a resolution of 0.1 degrees. Theta stage 220 rotates work piece 210 about axis of rotation 225 that is typically set to coincide with the symmetry axis of work piece 210. Typically, theta stage 220 will move work piece to three different orientations (0°, 120°, 240°) wherein the scanning is performed as was further discussed with reference to FIG. 1 above.

The stylus tip 230 moves over work piece 210 by moving the stylus 235 along the same direction as the axis of rotation 225. As the stylus tip 230 moves over the work piece 210, the stylus 235 moves up and down according to the topography of the work piece 210. The movement of the stylus 235 is detected by the gauge head 237, which in turn produces electrical signals in response to the movement of stylus 235, which mimics the topographical changes in work piece 210. Gauge head 237 can produce electrical signals by means well known in the art such as by measuring the mechanical movement of the stylus 235 using a piezoelectric, by measuring the capacitance difference between stylus tip 230 and work piece 210 or by measuring the tunneling of electrons between the stylus tip 235 and the work piece 210. Stylus tip 230 is mounted to stylus 235 that holds and drives the stylus tip 230 as well as provides a coupling to the head gauge 237. Surface scanner 240 is a conventional contact surface profiler used to move stylus 235 and stylus tip 230 as well as record and analyze data generated by the electronics in the surface scanner. Surface scanner 240 drives stylus 235 and stylus tip 230 in a direction of stylus motion 245 which is usually parallel to the axis of rotation 225.

Figure 3:
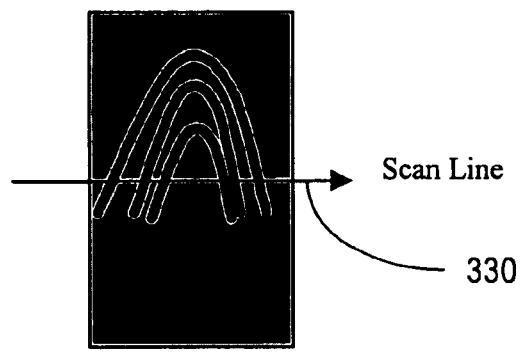
FIG. 3 is a diagram illustrating scan lines of a typical measurement done on a hydrodynamic motor bore with groves.

FIG. 3 is a diagram illustrating scan lines of a typical measurement done on a hydrodynamic motor bore with groves. Although FIG. 3 shows only three grooves there is no restriction on the number of grooves. Typically the actual number of grooves can be between 10 and 20. The scan direction is from left to right, as indicated by the direction of the scan line 330. Further details of the scan are discussed with reference to FIG. 4 below. Scan line 330 is the direction along which stylus 235 moves and corresponds to the stylus motion 245.

Figure 4:
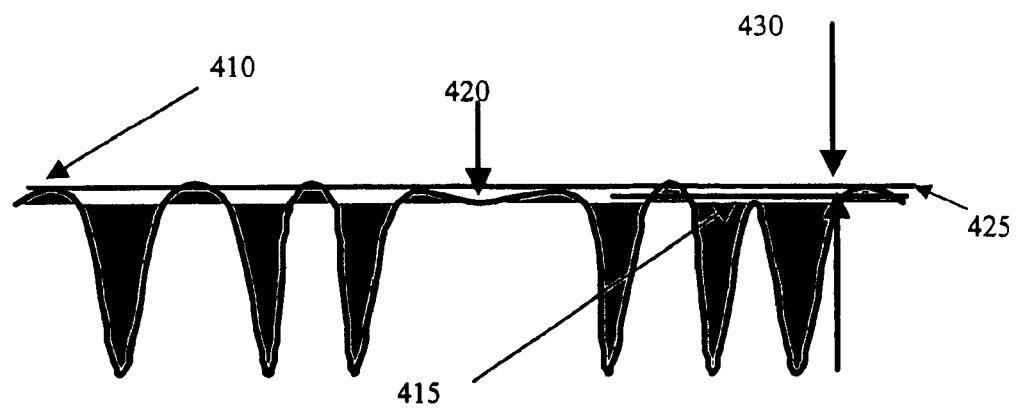
FIG. 4 is a diagram illustrating a typical profile of the groves in the bore including the radial erosion, apex region, original diameter and lowest peak

FIG. 4 is a diagram illustrating a typical profile of the groves in the bore including the original diameter 410, lowest peak 415, apex region 420, least square line 425, and ECM radial erosion 430. Original diameter 410 is data generated by scanner 240 and represents the topography of the bore grove erosion pattern. Original diameter 410, which is also known as the quiet zone, includes points corresponding to the diameter of the hub that depicted in FIG. 4 as the highest peaks similar to the labeled point 410 and above above least square line 425. Lowest Peak 415 represents the lowest part of the of the erosion pattern and is used to determine the ECM radial erosion 430. Apex region 420 represents the uppermost part of the erosion pattern and is also used to determine the ECM radial erosion 430. The least square line 425 is calculated using a least square fitting algorithm that is well known in the art. The least square line 425 is calculated using the apex region and the original diameter 410 (Quiet Zone).

ECM radial erosion 430 is defined as the distance between the least square line 425, passing through the apex region and original diameter (Quiet Zone), and the lowest peak of the ECM bore on the given journal. The ECM radial erosion 430 is determined using the following equations:

$R_i$ = Radial Erosion obtained from the ith scan

N = Number of Scans $Ravg = \Sigma(R_i)_{i=1 \ to \ N}/N$

Land Erosion = 2*Ravg

Figure 5:
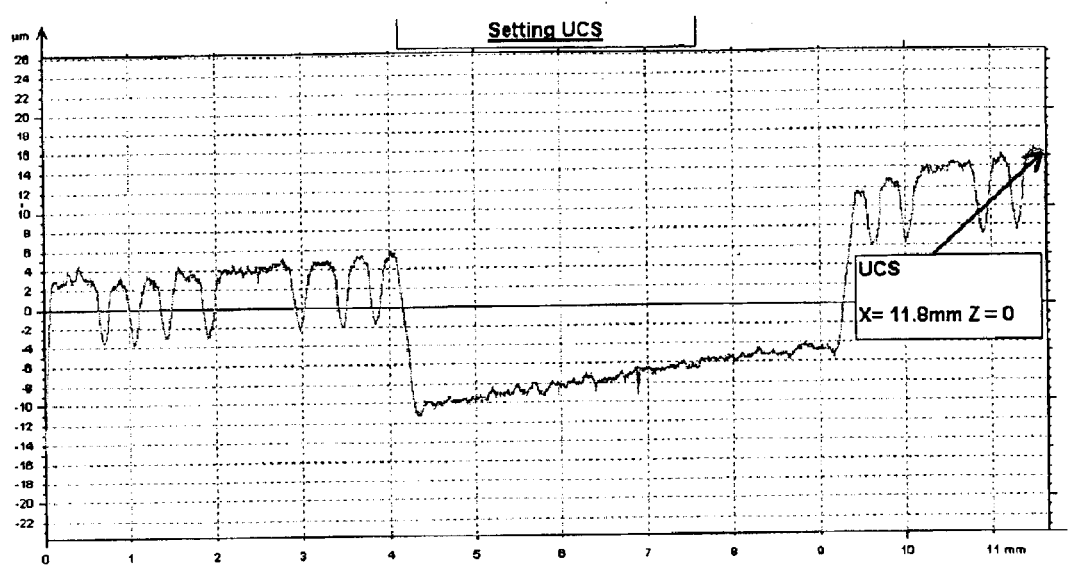
FIG. 5 is a plot showing a typical scan of a hydrodynamic motor bore with groves.

FIG. 5 is a plot showing a typical scan of a hydrodynamic motor bore with groves. The x-axis of FIG. 5 shows the scan length as 11.8 mm. The scan length is typically set to be between 5 mm and 20 mm. The scan length is chosen to optimize both speed of measurement and resolution. The longer the scan length the longer the measurement will take and vice versa. The y-axis represents the depth profile of the erosion pattern so that the combination of the scan length and depth profile gives an accurate view of the groves along the direction of motion of the stylus 235.

Figure 6:
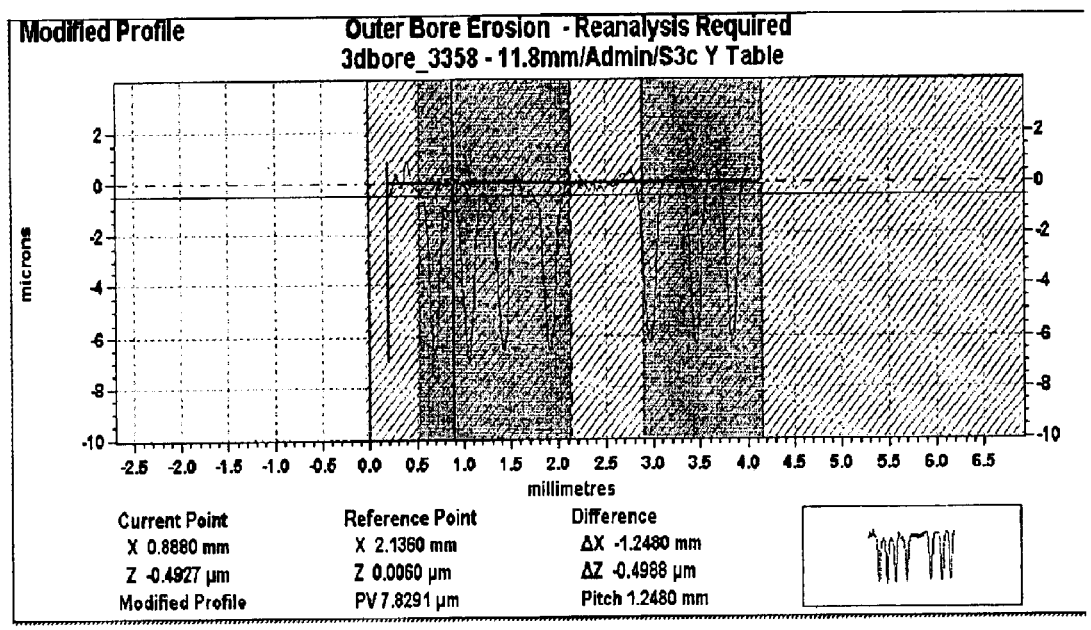
FIG. 6 is a plot showing a typical scan showing analysis and results of an outer bore erosion pattern measurement.

FIG. 6 is another example of a typical scan showing analysis and results of an outer bore erosion pattern measurement. The scan in FIG. 6 is obtained in accordance with this invention by first aligning the surface scanner 240 with the axis of rotation 225 Chuck using a work piece 210, which is gauge pin having a size equal to the bore diameter. Scanning the gauge pin over a length of 20 mm does the alignment. The scanned profile should be a straight line with a maximum height difference between the ends of less than 30 microns. The alignment for the theta axis (run out) is done by positioning the stylus on the top of the gauge pin and rotating the pin through one complete rotation. The stylus reading should be constant through out the rotation. Once the alignment is done, the theta stage 220 is taken to a home position. The work piece to be measured is then loaded the part on to the theta chuck 215 such that the flat portion of the work piece being measured is at the top and parallel to the upper edge of the stylus 235. The stylus 235 is then moved inside the bore such that there is about 11.9 mm of travel between the edges of the bore and start point of the scan. The stylus is then brought into contact with the work piece 210. The User Coordinate System (UCS) consisting of of X and Z is then set to Zero and the work piece is scanned. The position of the stylus 235 is then set on the Apex (for example, 2.5 mm position) of the part and the Y stage is manually moved to the lowest point of the bore. The theta chuck 215 is then rotated to an angle where the stylus indicator indicates the lowest value, indicating the presence of a groove. The theta chuck 215 is the turned about 12°. This position is labeled as the 0° Position, for the remainder of the measurement and serves as a reference point.

At this time the UCS X is set to 11.8 and Z is set to Zero as illustrated in FIG. 5. Once this reference is set the scan is done and surface profile is measured. The profile data is illustrated in FIG. 6. Once the surface scan is completed the data is analyzed by manually finding the highest point on the scan which is defined as the shortest distance from Z=0. The Delta z, which indicated in FIG. 6, is the R1__Outer__Bore. The theta stage 220 is rotated by 120 degrees and the same measurements are performed to obtain a second measurement at a second position called R2__Outer__Bore. The theta stage 220 is again rotated by another 120 degrees and another measurement is taken to obtain a third measurement R3__Outer__Bore. Finally, the bore erosion is calculated using the formula:

Ravg__Outer__Bore=(R1__Outer__Bore+R2__Outer__Bore+R3__Outer__Bore)/3

Outer__Bore__Erosion=Ravg__Outer__Bore*2

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A method for measuring bore erosion, comprising:
 a) aligning a stylus with a gauge pin;
 b) providing a workpiece comprising a journal;
 c) covering the length of a journal;
 d) moving a stylus to an apex region;
 e) locating a grove minimum by rotating a hub;
 f) rotating said hub to a fixed position;
 g) scanning between a first endpoint and a second endpoint collecting data during said scan;
 h) analyzing said data by fitting said data to a line;
 i) locating a lowest peak in said groove;
 j) calculating the erosion.

2. The method of claim 1 further comprising
 rotating said work piece by a fixed amount to a second position; and
 repeating steps a through j at said second position.

3. The method of claim 2 wherein said fixed amount of rotation is 120 degrees from position of first measurement.

4. The method of claim 2 further comprising
 rotating said working piece by a second fixed amount to a third position; and
 repeating steps a through g at said third position.

5. The method of claim 4 wherein said second fixed amount of rotation is 120 degrees from position of second measurement.

6. The method of claim 1 wherein said fitting of said data to a line includes using a least square fit.

7. The method of claim 1 wherein said aligning of stylus with a gauge pin includes measuring a gauge pin having a size substantially the same as that of a bore diameter to be measured.

8. The method of claim 7 wherein said measuring a gauge pin includes scanning the gauge pin over a length of 10 mm to 30 mm.

9. The method of claim 7 wherein said measuring a gauge pin includes scanning the gauge pin over a length of 15 mm to 25 mm.

10. The method of claim 7 wherein said measuring a gauge pin includes scanning the gauge pin over a length of about 20 mm.

11. The method of claim 7 wherein said measuring a gauge pin includes scanning the gauge pin along a line with a maximum height difference between the ends of less than 30 microns.

* * * * *